Nov. 26, 1935.　　　J. F. CAVANAGH　　　2,021,983
APPARATUS FOR MAKING INNER TUBES FOR TIRES
Filed Oct. 1, 1930　　　2 Sheets-Sheet 1
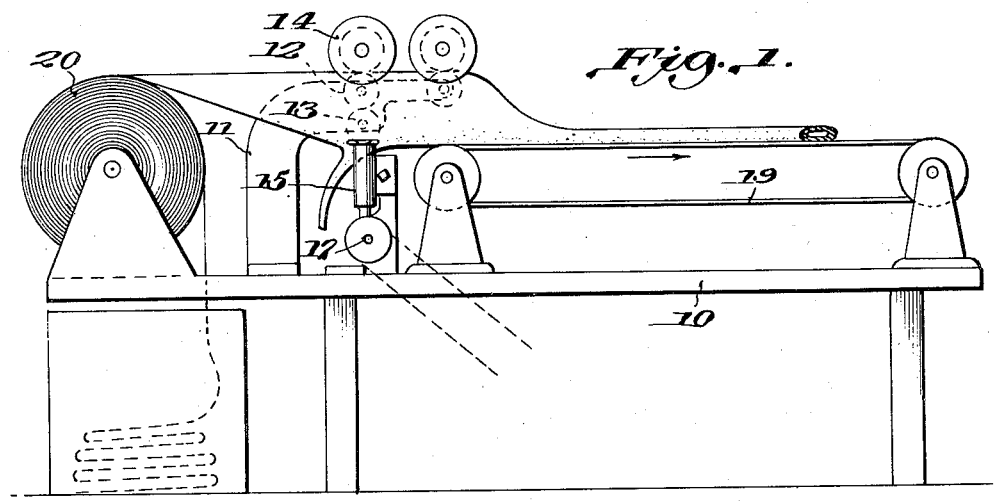
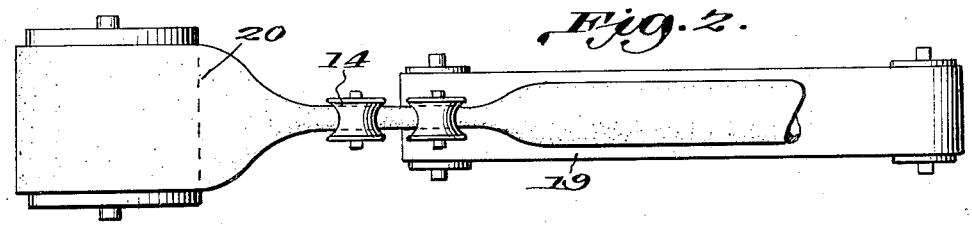
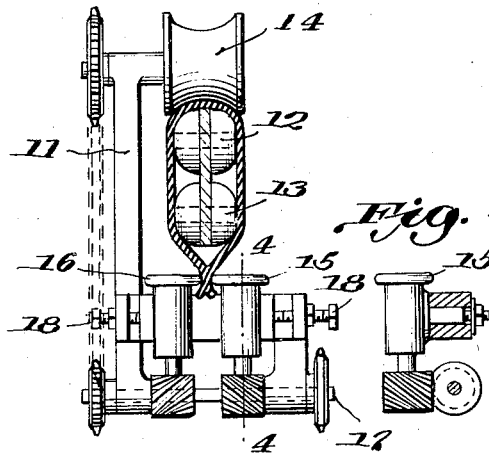
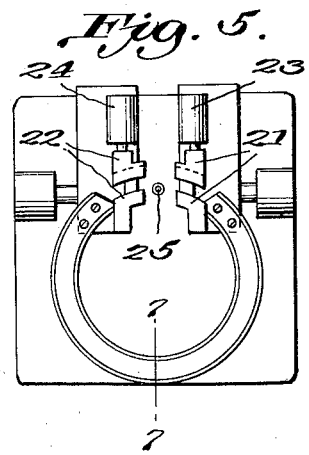
Inventor
John F. Cavanagh
By Chas. J. Williamson
Attorney Nov. 26, 1935.  J. F. CAVANAGH  2,021,983
APPARATUS FOR MAKING INNER TUBES FOR TIRES
Filed Oct. 1, 1930  2 Sheets-Sheet 2

Inventor
John F. Cavanagh
By Chas. J. Williamson
Attorney

Patented Nov. 26, 1935

2,021,983

UNITED STATES PATENT OFFICE 2,021,983

APPARATUS FOR MAKING INNER TUBES FOR TIRES

John F. Cavanagh, Pawtucket, R. I., assignor to William Wallace Potter, Pawtucket, R. I.

Application October 1, 1930, Serial No. 485,734

3 Claims. (Cl. 154—9)

Objects of my invention are the production or manufacture of inner tire tubes at greater speed per operation and elimination of molds, thus materially reducing production cost and at the same time giving a tube of high quality.

My invention consists in whatever is described by or is included within the terms or scope of the appended claims.

Briefly described, the practice of my invention involves the making of a tube blank from sheet stock in continuous or indefinite length as by passing it over a former or from an extruder cutting such tube blank into lengths suitable for the required inner tube diameter, and then joining the ends of each such length to complete the tube, the latter being partially inflated previous to vulcanizing.

In the drawings, I show aparatus for practicing my invention, in which—

Fig. 1 is a side elevation of a continuous tube blank forming apparatus;

Fig. 2 is a top plan view thereof;

Fig. 3 is a vertical cross section thereof;

Fig. 4 is a detail view in section on line 4—4 of Fig. 3;

Fig. 5 is a top plan view of the cross-seam, or end-joining device open ready to receive the tube-blank.

Figure 6:
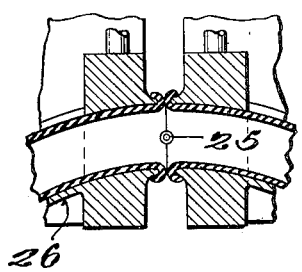
Fig. 6 is a like view with the parts in their position after completion of the "biscuit" seam.
Figure 8:
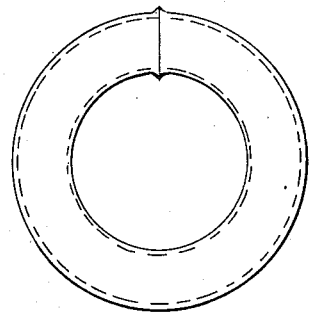
Fig. 8 is a side view of the "biscuit" ready for vulcanizing.

Referring to the drawings (Figs. 1 to 3) upon a bed plate, 10, is mounted an arm, 11, which supports a horizontal arm over which the flat or sheet stock is passed and folded transversely by the action of rolls above and at the bottom. On opposite sides the horizontal arm has two pairs of rolls, 12 and 13, one pair above the other over which the sheet stock is turned, or folded, with the edges lowermost. A driven roll, 14, engages the stock on top of the arm.

Directly under rolls 13 is a pair of seaming rolls, 15 and 16, with convex peripheries that engage and press together the opposite edges of the stock to complete the tube formation. To drive roll 14 and rolls 15 and 16, they are geared to a shaft, 17, by spiral gears and chain and sprocket, as shown.

The seaming rolls 15 and 16 are adjustable by set screws 18.

Mounted upon bed plate, 10, is and endless conveyor apron, 19, arranged to move at a speed suitable to that of the seaming and take-off rolls by driving means not shown.

The flat stock is supplied from a roll, 20, of sheet rubber of the proper width and with cloth of paper between layers in accordance with the common method of handling rubber stock of this nature. Stock roll, 20, is mounted between end standards on the bed plate.

After the straight tube blank has been formed, it is cut off by a proper gauge, to a length for an inner tube of desired diameter, and such length is then, in a circular form, placed with its free ends opposite one another between two pairs of open jaws, 21, and 22, alike, but opposite, and each curved in correspondence with the radius of the finished tube, and the cross section of the two jaws of a pair concaving in correspondence to the cross section convexity of the embraced tube end. One jaw of a pair is stationary as to the other, and the other jaw is movable in one case by a hydraulic cylinder 23, and in the other case by a similar hydraulic cylinder 24. Fig. 5 shows the opened and separated positions of the jaws, ready to receive a tube blank, and Fig. 6 shows their closed position on the completion of the cross seaming or closure of the blank ends.

Figure 7:
Fig. 7 is a cross section of the support for the tube blank of the tube end uniting device.

At the time the tube ends are ready to be united and with the tube ends placed within the jaws, the tube is partially inflated, in some suitable way, as by means of compressed air through a hollow needle, 25, that is thrust between the tube ends just before they are brought in contact, and then withdrawn, or by means of a "pill" previously placed in the tube blank. The tube blank, while in the jaws (which are short) may be supported throughout its circumferential extent, especially when the "pill" is used, by means of a sort of half mold, 26, having the cross section shown in Fig. 7, which is something more than a half-circle so that, while permitting the blank to be readily placed in and removed, nevertheless surrounds it sufficiently to hold it in shape and position.

A nipple may be attached to the tube as when the seam is formed, by inserting it thereat, to inflate the tube during curing.

Figures 9, 10, 11, 12:
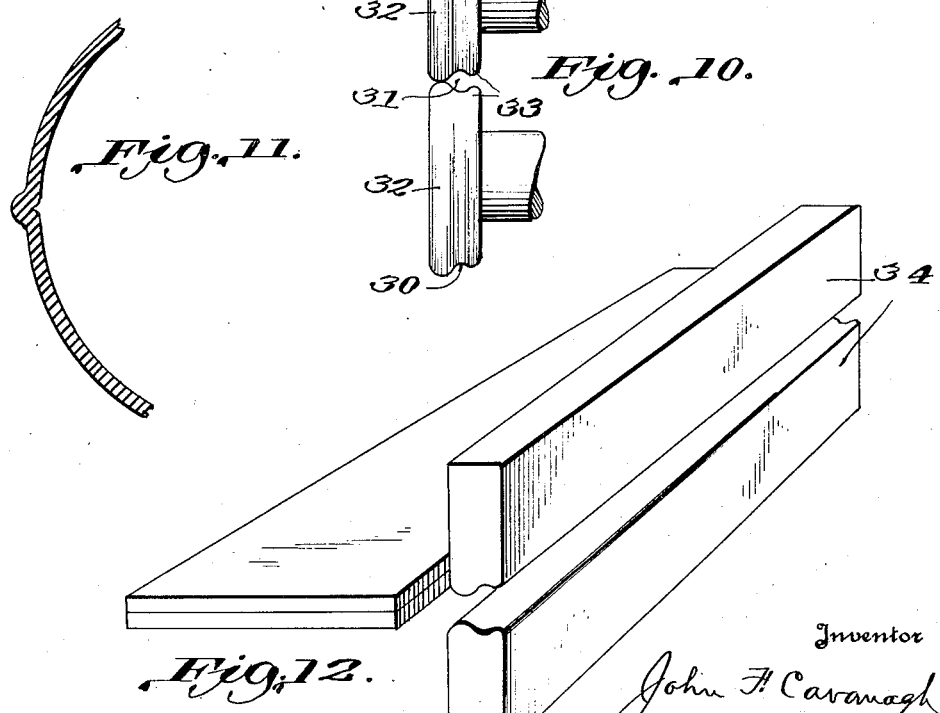
Fig. 9 is a side view of an extruder for making the tube blank in circular form.
Fig. 10 is an end elevation partly in section of a pair of rolls for producing a seam according to my invention in which the seam portion is not thinner than the rest of the article wall.
Fig. 11 is a cross section of a tire tube having such a seam.
Fig. 12 is a perspective view of a pair of straight jaws for producing such a seam.

Instead of forming the tube blank in straight sections, it may be given a circular form, as by the use of an extruding machine shown in Fig. 9, from the curved nozzle, 27, of which the tubing is delivered continuously to a cylindrical drum, 28, about which it is spirally coiled. The drum is revolved at a speed to wind the tubing at the rate of its delivery from the nozzle. From the coil thus produced the lengths for the individual tube blanks are cut off for placing in the jaws.

It will be understood that when the tube ends have been placed in and clamped by the jaws, the extremities are turned, or rolled back (which may be readily done by the hand of the operator) so that each end has a slight external annular collar or flange, and rounded, smooth surfaces come together to form the seam.

An important feature of my invention is the production of a seam by bringing together the similar edges of one sheet of rubber, or such edges of two sheets so that not only no diminution of sheet thickness will occur at the lap or seam, but if desired a greater thickness secured. This is illustrated in Figs. 10 to 12, and will be found a radical departure from and improvement over the seam production methods heretofore practiced in the rubber industry, such for example as that known as the "shear" seam, "pinch" seam and "scissors" seam. Seams so produced are often the thinnest and therefore the weakest part of the cured or finished article, and this is a serious matter in articles intended to stand internal pressure, such as inner tubes for tires.

By my invention in joining rubber sheet edges in a seam I subject the overlapping edges to a kneading action,—not merely pressure and thus work them into one another so to speak, and thereby effect a most intimate and strong union.

In Fig. 10 a pair of matching rolls, 30, act upon the overlapped edges of the rubber sheet or sheets, the periphery of each roll having two convexly rounded annular ribs at opposite sides, between which is an annular groove, 31, one rib, 32, being of greater diameter than the other, 33, so that the ribs, 32, of the two rolls will touch peripherally and act as severing means, an annular space being thus left between the ribs, 33, through which passes the overlapped edges to be seamed. The space between the two ribs, 33, where the closest approach is equal to the sheet thickness if the wall at the seam is to be the same thickness of rubber as elsewhere, and said ribs, 33, are the kneading means. Successive portions of the opposing peripheries of the ribs, 33, coming into contact with the rubber passing between them, there is thus a pushing action exerted on the rubber that constitutes what I mean by kneading as there results more or less relative movement of the two plies of rubber upon one another and into one another which corresponds with a kneading action.

As shown in Fig. 12 two straight jaws, 34, are used, the opposing edges being ribbed and grooved as in the case of the rolls of Fig. 10.

When two pieces or edges of sheet rubber are laid face to face and then introduced between the revolving rolls or between the press actuated jaws, the overlaps are pressed into very intimate contact coincident with the biting or severing action adjacent one side of the point of severance. As the rubber is unvulcanized and hence in a plastic state, it flows into the groove between the ribs. As the seaming operation is of short duration and a certain amount of resiliency is possessed by the uncured stock, the seam takes the form shown in Fig. 11, upon removal from the seaming device.

Practice has proved that seams made by jaws or rolls having a severing portion, a kneading portion and a recess between them produce a highly efficient seam.

As the portions of rubber within the grooves must be pressed together to unite them, the depth of the grooves should be at least a little less than the normal thickness of the two laps of rubber.

What I claim is:—

1. In a device of the character described, a pair of rotary seam forming members provided with opposed fabric severing portions and fabric kneading portions in proximity to said severing portions, a recess being between said severing portions and said kneading portions.

2. Means for forming inner tire tubes comprising a pair of opposing rollers with peripheral portions side by side of greater and less diameter that are convex in cross-section, the portions of greater diameter being opposed and the portions of lesser diameter being opposed and an annular recess situated between them.

3. In a device of the character described, opposing members having means for severing plies of fabric introduced therebetween and means movable to coincidentally knead said plies adjacent the severed edge and parallel thereto, in which the movable means are opposed rollers with peripheral ribs that exert a pushing action on the plies of fabric between them.

JOHN F. CAVANAGH.